United States Patent [19]

Trigg et al.

[11] Patent Number: 5,755,304
[45] Date of Patent: May 26, 1998

[54] ELECTRIC MOTOR OPERATED WHEEL

[75] Inventors: Robert V. Trigg; Jeroen N. M. Kuijpers, both of Schiphol-Rijk, Netherlands

[73] Assignee: Yamaha Hatsudoki Kabushiki Kaisha, Iwata, Japan

[21] Appl. No.: 511,642

[22] Filed: Aug. 7, 1995

[30] Foreign Application Priority Data

Aug. 8, 1994 [JP] Japan .................................. 6-206015
Aug. 8, 1994 [JP] Japan .................................. 6-206016

[51] Int. Cl.⁶ .................................................... B62M 7/12
[52] U.S. Cl. ........................ 180/65.5; 180/65.2; 180/205; 180/220
[58] Field of Search ............................... 180/65.1, 65.2, 180/65.5, 205, 206, 214, 217, 220, 231, 216; 474/134, 135, 150, 197

[56] References Cited

U.S. PATENT DOCUMENTS

| | | | |
|---|---|---|---|
| 1,320,044 | 10/1919 | Heaney | 474/134 |
| 1,809,481 | 6/1931 | Haussmann | 474/134 |
| 2,756,832 | 7/1956 | Dalrymple | 180/206 |
| 3,864,986 | 2/1975 | Bochan | 474/109 |
| 3,908,776 | 9/1975 | Dudley | 180/65.5 |
| 3,991,843 | 11/1976 | Davidson | 180/206 |
| 4,299,582 | 11/1981 | Leitner | 474/109 |
| 4,541,500 | 9/1985 | Gelhard | 180/205 |
| 5,243,881 | 9/1993 | Hayashi | 477/45 |
| 5,341,892 | 8/1994 | Hirose et al. | 180/220 |

FOREIGN PATENT DOCUMENTS

| | | |
|---|---|---|
| 561268 | 9/1993 | European Pat. Off. . |
| 4000960 | 7/1991 | Germany . |
| 5262273 | 10/1993 | Japan . |
| 6156361 | 6/1994 | Japan . |
| 1504121 | 3/1978 | United Kingdom . |
| 2269145 | 2/1994 | United Kingdom ............ 180/65.5 |
| 9311992 | 6/1993 | WIPO . |
| 9425333 | 11/1994 | WIPO . |

OTHER PUBLICATIONS

European Search Report dated Feb. 25, 1996.

*Primary Examiner*—Brian L. Johnson
*Assistant Examiner*—Frank Vanaman
*Attorney, Agent, or Firm*—Knobbe, Martens, Olson & Bear LLP

[57] ABSTRACT

An electric motor operated wheel that contains the electric motor, the batteries and battery carrier, and controller in an area between the rim and hub of the wheel. These components are enclosed by a rotatable disk that spaces the rim from the hub and integrally connects them and a fixed cover disk disposed on the opposite side. The construction is such that the axial width of the wheel driving components is not substantially greater than the width of one of the hub and the rim. The electric motor drives the wheel through a flexible transmitter transmission, including a tensioning mechanism that maintains a tension on the driving belt that is related to the driving load.

34 Claims, 10 Drawing Sheets

ELECTRIC MOTOR OPERATED WHEEL

BACKGROUND OF THE INVENTION

This invention relates to an electric motor operated wheel and more particularly to an self contained electric motor driven wheel.

There have been proposed wheeled vehicles that are normally pedal or otherwise operated by the human power of the user. Such vehicles may comprise bicycles or other types of wheeled vehicles. In order to assist in the operation of these vehicles and to facilitate their use by persons having limited physical capabilities, it has been proposed to provide an electric motor arrangement for powering the wheel of the vehicle. The electric motor power may be either utilized to supplement the manual power or, in some instances to provide the sole driving force.

With this type of vehicle, it is obviously necessary to provide in addition to the normal pedal or manual operator for the wheel, an electric motor, a transmission for transmitting power from the electric motor to at least one of the vehicle wheels and a controller for controlling the application of electric power to the motor to control the amount of electric motor assist.

Obviously, both the electric motor, its transmission and the battery that provides the electric power are relatively sizeable components of the system. Where the vehicle is compact, as with a bicycle or the like, it has been the practice to position some or all of these components on the vehicle frame. However, this generally results in the placement of those components in an area between the legs of the rider. This has a number of disadvantages.

In addition to the foregoing problems, the mounting of the components of the electrically operated drive on the frame or on exterior components of the vehicle does not improve the appearance of the vehicle. Furthermore, the more weight that is mounted directly on the vehicle frame, the harder the vehicle is to manipulate by the rider when maneuvering the vehicle either during riding or when walking aside the vehicle.

It is, therefore, a principal object of this invention to provide an improved and compact electric motor drive for a vehicle wheel.

It is a further object of this invention to provide an improved electric motor drive for a vehicle wheel wherein substantially all of the drive components are disposed other than on the frame of the vehicle.

Although attempts have been made to make the electric motor drive more compact and to achieve some of these results by the placement of the electric motor and its transmission in the vicinity of the wheel, the placement of the battery or batteries has still presented problems. In order to ensure that the device is capable of electrical operation for some time, the battery or batteries become quite large. Also, it is necessary to service the batteries either for recharging or replacement. Therefore, the battery must be mounted in a relatively accessible location, and this generally resulted in the frame mounting of the battery or mounting on an auxiliary that is attached to the frame. This presents the afore-noted problems.

It is, therefore, a still further object of this invention to provide an improved battery arrangement for an electrically powered vehicle wheel.

It is a yet further object of this invention to provide an improved battery mounting arrangement for an electrically powered vehicle wheel wherein the battery may be confined within the structure of the wheel and yet readily serviced.

In connection with the actual transmission for transmitting power from the electric motor to the driven wheel, it is generally the practice to embody a transmission that has a substantial step-down in speed ratio. This is because the electric motor obviously operates at a much higher rate of speed than the wheel. Furthermore, the step-down is desirable in order to increase the power that is actually exerted by the electric motor on the wheel. For such large speed reductions, rather substantial transmissions are required.

One type of transmission which permits the desired step-down ratio and also permits a compact construction is a flexible transmitter transmission. These transmissions comprise either belts, chains or toothed belts. With such flexible transmitter transmissions, however, the flexible transmitter tends to elongate on use. Therefore, there must be some adjustment made to compensate for this elongation. Furthermore, the tension the transmitter is rather critical. It is desirable to maintain a predetermined tension on the transmitter so that it cannot become inadvertently displaced from its driving and driven elements. However, the more tension that is placed on the transmitter the shorter its life.

Therefore, it is a further object of this invention to provide an improved flexible transmitter transmission for driving a wheel from an electric motor.

It is a further object of this invention to provide an improved automatic tensioner mechanism for such a transmission.

As has been previously noted, it is desirable if the entire propulsion assist system for the vehicle wheel can be contained within the vehicle wheel. In addition to providing a neat appearance, this offers the possibility of being able to offer the wheel and its drive as a separate accessory that can be applied to conventional, manually powered vehicles to convert them into electric power or electric power assisted vehicles.

It is, therefore, a still further object of this invention to provide an improved wheel assembly that incorporates an integral electric power drive so that it can be utilized with a wide variety of vehicles.

SUMMARY OF THE INVENTION

A first feature of this invention is adapted to be embodied in a powered wheel for providing a propulsion force for an associated vehicle. The wheel has a hub that is adapted to be rotatably journaled upon an axle. A rim is provided in fixed relation to the hub and extends circumferentially therearound and is adapted to mount a tire. An electric motor is disposed circumferentially between the hub and the rim and extends axially at a distance not substantially greater than the axial length of the one of the hub and the rim. Transmission means are interposed between the electric motor and the wheel for driving the wheel from the electric motor. A battery case is disposed circumferentially between the hub and rim and is adapted to carry a battery. The battery case and battery together have an axial length that is not substantially greater than the axial length of at least one of the hub and the rim.

Another feature of the invention is adapted to be embodied in a powered wheel for providing a propulsion source for an associated vehicle. The wheel is comprised of a hub and rim assembly with the rim being adapted to mount a tire. An electric motor, transmission for driving the wheel from the electric motor and an electrical power source are contained as a unit with the wheel for powering the wheel and for detachable detachment to an associated vehicle for propelling the vehicle.

3

A further feature of the invention is adapted to be embodied in a flexible transmitter transmission that is comprised of a driving pulley and a driven pulley each rotatable about respective parallel axis. An idler pulley bracket carries a pair of idler pulleys rotatable about axes parallel to the axes of said driving and driven pulleys. The idler pulley bracket is disposed so that the idler pulleys are positioned on opposite sides of one of the driving and driven pulleys. A flexible transmitter transmission extends around the pulleys for transmitting a drive from the driving pulley to the driven pulley. Means support the idler pulley bracket for pivotal movement about a pivot axis parallel to the axes of the adjacent driving and driven pulleys and on the side thereof where the driving flight of the flexible transmitter is positioned for pivoting said idler bracket to maintain tension on said flexible transmitter related to the driving load.

DETAILED DESCRIPTION OF THE PREFERRED EMBODIMENT

Figure 1:
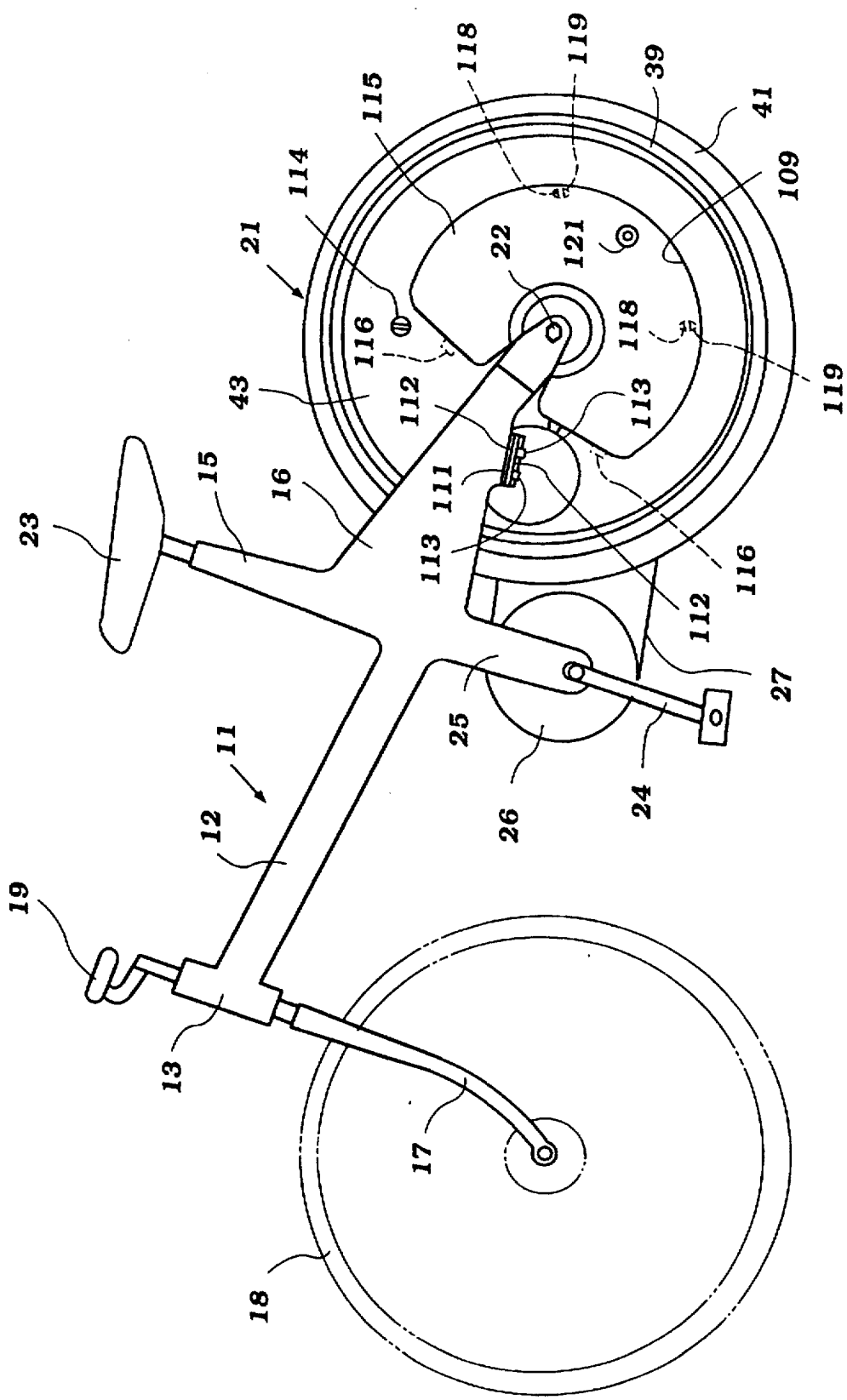
FIG. 1 is a side elevational view of a bicycle having an electrically powered wheel constructed in accordance with an embodiment of the invention.

Referring now in detail to the drawings and initially primarily to FIG. 1, a bicycle constructed and powered in accordance with an embodiment of the invention is indicated generally by the reference numeral 11. The invention is described in conjunction with a bicycle because, for reasons as already noted, the invention has particular utility in conjunction with vehicles which are normally manually powered. In addition, the invention has particular utility in conjunction with compact vehicles of this general type wherein space is at a premium and wherein it is desirable to position the various components of the electrical power system so that they will not interfere with the rider.

The bicycle 11 is comprised of a main frame assembly, indicated generally by the reference numeral 12 which is comprised of a head pipe 13, a main frame tube 14, a seat pillar 15 and a rear arm assembly 16. These frame members 12, 13, 14, 15 and 16 may be formed from any suitable material in a manner is well known in the art.

A front fork 17 is dirigible supported by the head pipe 13 in a known manner. The front fork journals a front wheel 18. The front fork 17 and front wheel 18 may be steered by means of a handlebar assembly 19 carried at the upper end of the front fork 17 in any known manner.

A rear wheel assembly, indicated generally by the reference numeral 21 is journaled in a manner to be described for rotation about an axle 22 at the rear end of the trailing arm 16. The manner of this support will be described later by reference to the remaining figures.

A saddle type seat 23 is carried adjustably at the upper end of the seat pillar 15. A rider seated on the seat 23 may manually drive the rear wheel 21 by operating a conventional crank-type, pedal mechanism 24 mounted on a frame extension 25 of the frame assembly below the seat pillar 15. The pedal assembly 24 is connected to a driving sprocket 26 which, in turn, drives a chain 27. The chain 27, in turn, drives a driven sprocket 28 (FIG. 5) that is in driving relationship with the rear wheel 21 via a one-way clutch 29. The one-way clutch 29 is effective to permit the driving chain 27 to rotate the rear wheel 21 while, at the same time, permitting the rear wheel 21 to overrun the driving chain 27 either when coasting or when operating under electrical power, in a manner which will become apparent.

Figure 5:
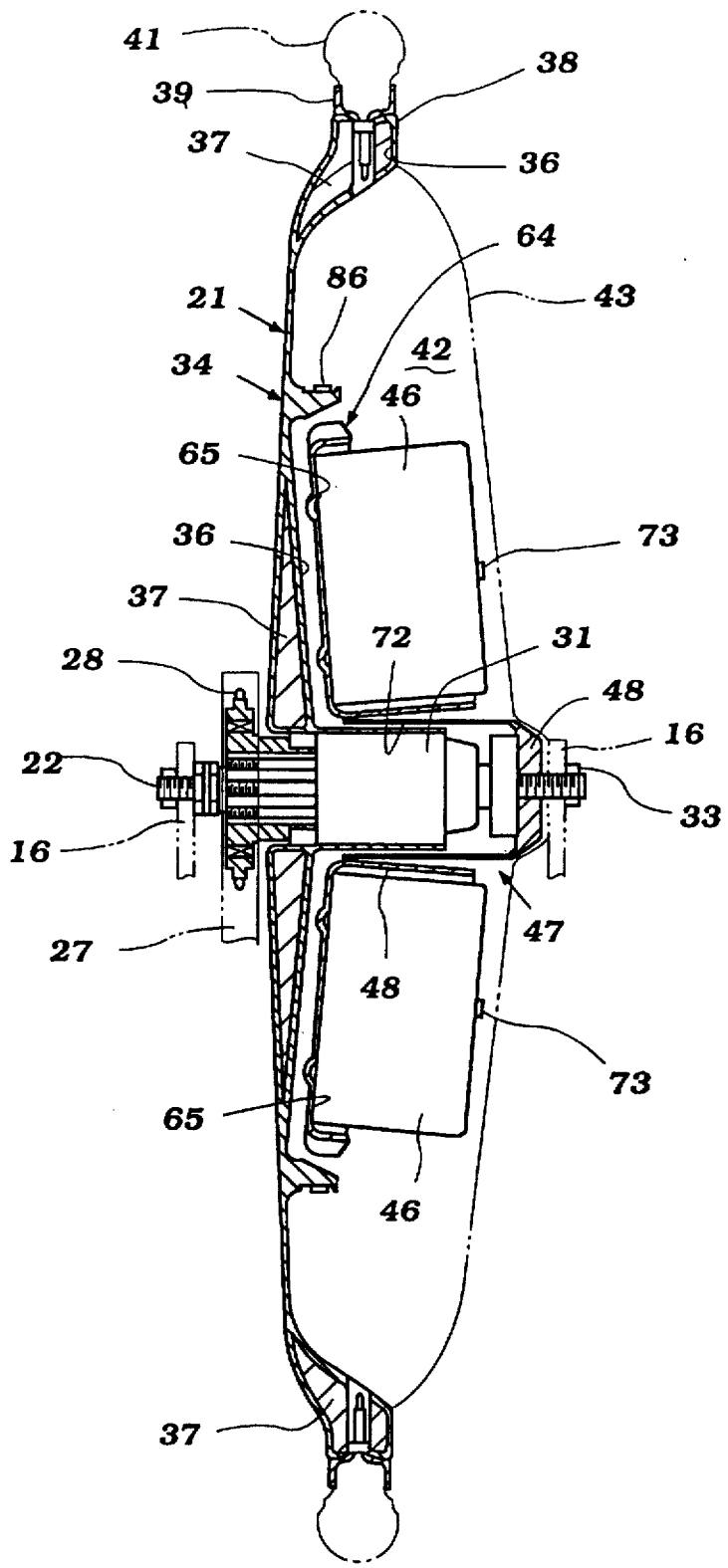
FIG. 5 is an enlarged cross-sectional view taken along the line 5—5 of FIG. 3.
Figure 6:
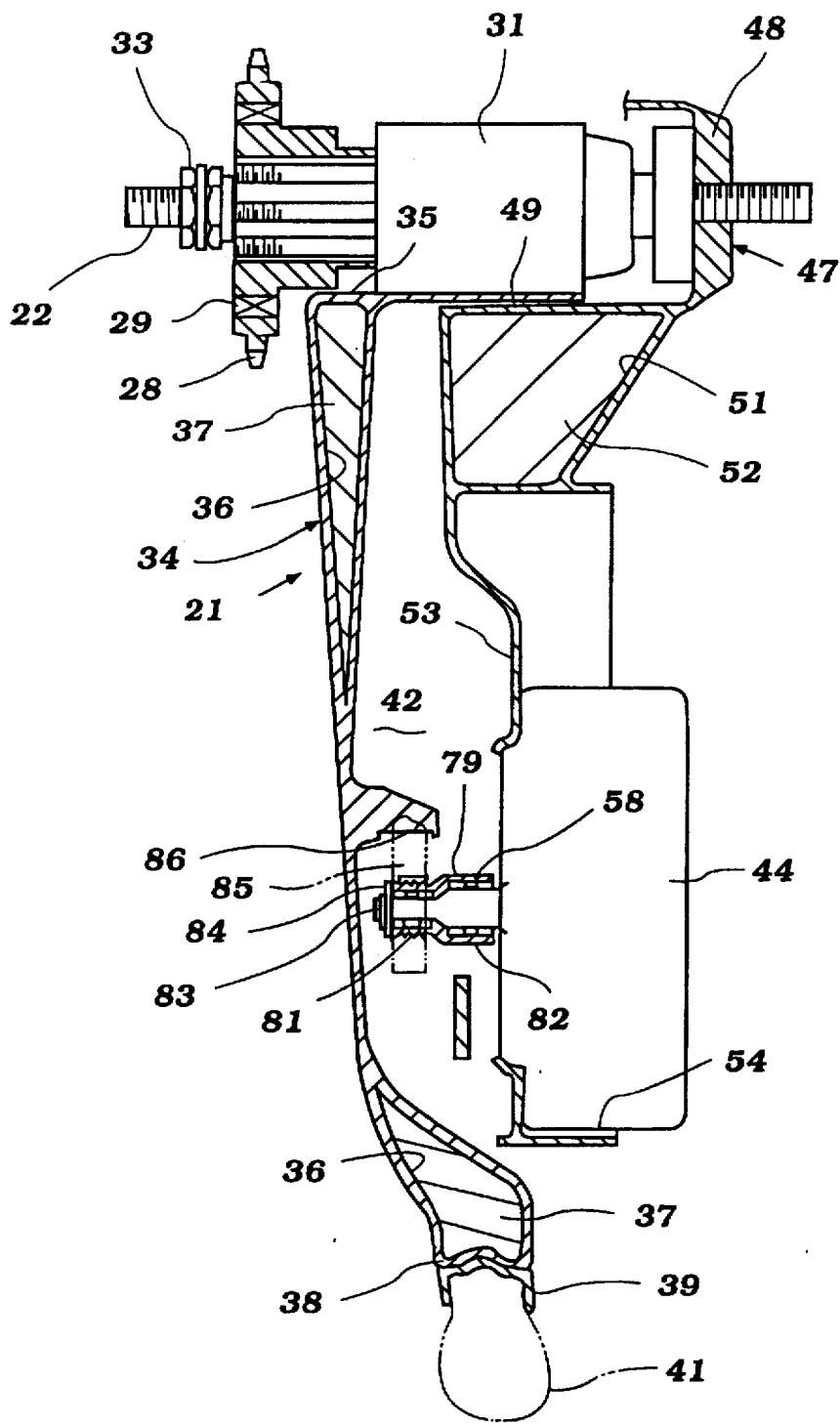
FIG. 6 is a further enlarged cross-sectional view taken along the line 6—6 of FIG. 3, and shows a portion of the driving relationship between the electric motor and the powered wheel.
Figure 7:
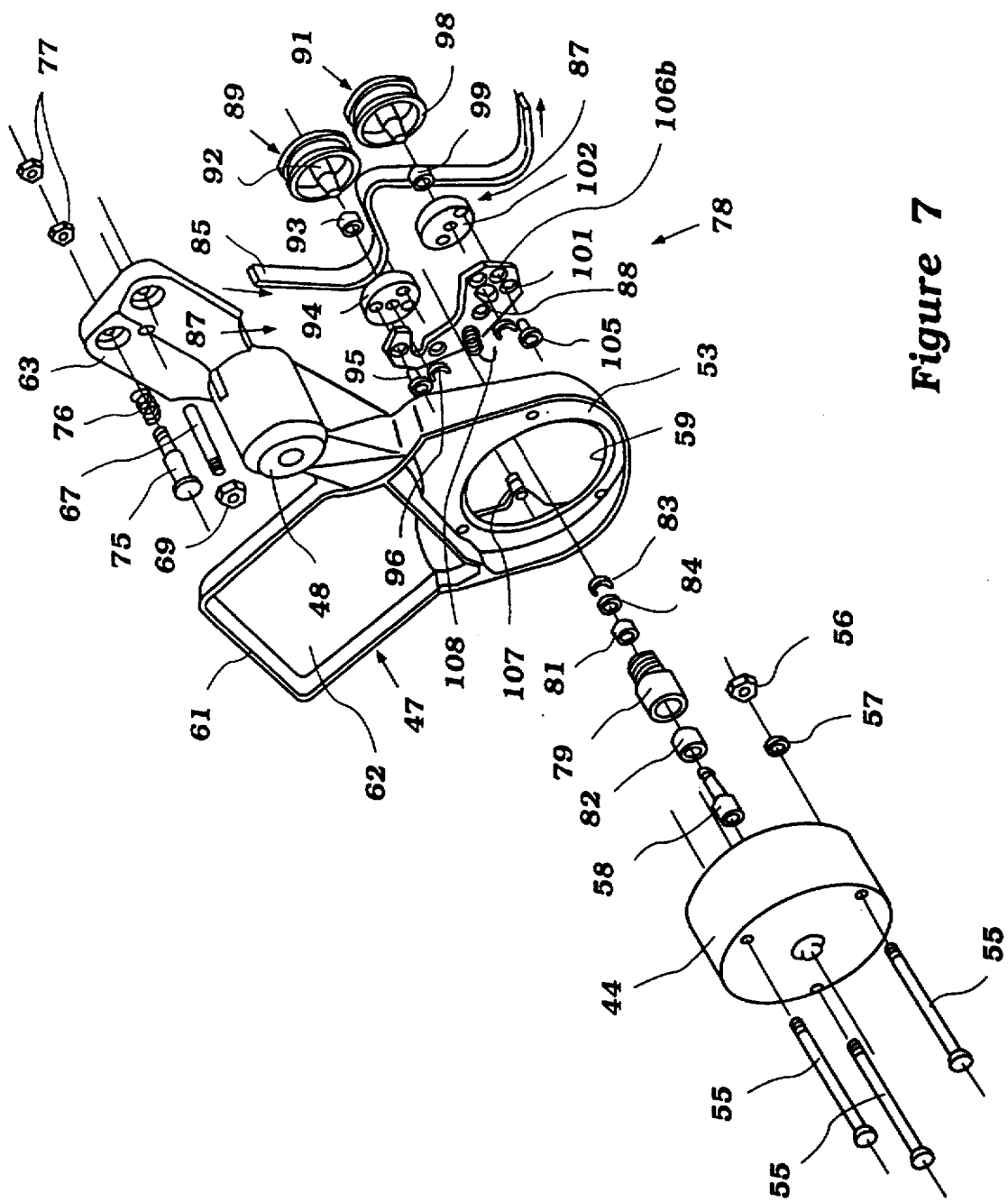
FIG. 7 is a partially exploded, perspective view showing the mounting for the electric motor, its transmission and its relationship to the overall supporting mechanism, with the battery cases removed and with the controller also removed.

The construction of the rear wheel 21 will now be described by primary reference to FIGS. 5 and 6, although this wheel also appears in FIGS. 1 through 4. The rear wheel 21 is comprised of a hub portion 31 which is, in turn, rotatably journaled upon the fixed axle 22 which fixed axle 22 is affixed to the bifurcated side portions of the rear trailing arm 16 by means of nuts 33. As has been previously noted, the manually driven sprocket 28 is connected by means of the one-way clutch 29 to drive the hub 31 when the pedal force is applied to the driving chain 27.

The wheel further includes a disc shaped member 34 which is disposed at one side of the wheel 21 and which has a flange portion 35 that is affixed suitably to the hub 31. This disc shaped member 34 is formed from a lightweight material such as a composite and has cavities 36 which are filled with an appropriate filling material 37 to add rigidity to the construction while maintaining a low weight. At its outer peripheral edge, the disc shaped member 34 is provided with a circumferentially extending part 38 on which a rim 39 is affixed in a known manner. The rim 39 carries a pneumatic tire 41.

Because of the configuration of the rear wheel 21 as thus far described wherein the disc shaped member 34 is disposed at substantially one side of the wheel 21 and extends outwardly beyond the rim 39 at this one side, a cavity 42 is defined between the rim 39 and the hub 31. This cavity is closed by means of a stationary cover plate 43 which is non-rotatably affixed to the frame trailing arm member 16 in a manner which will be described.

Figure 2:
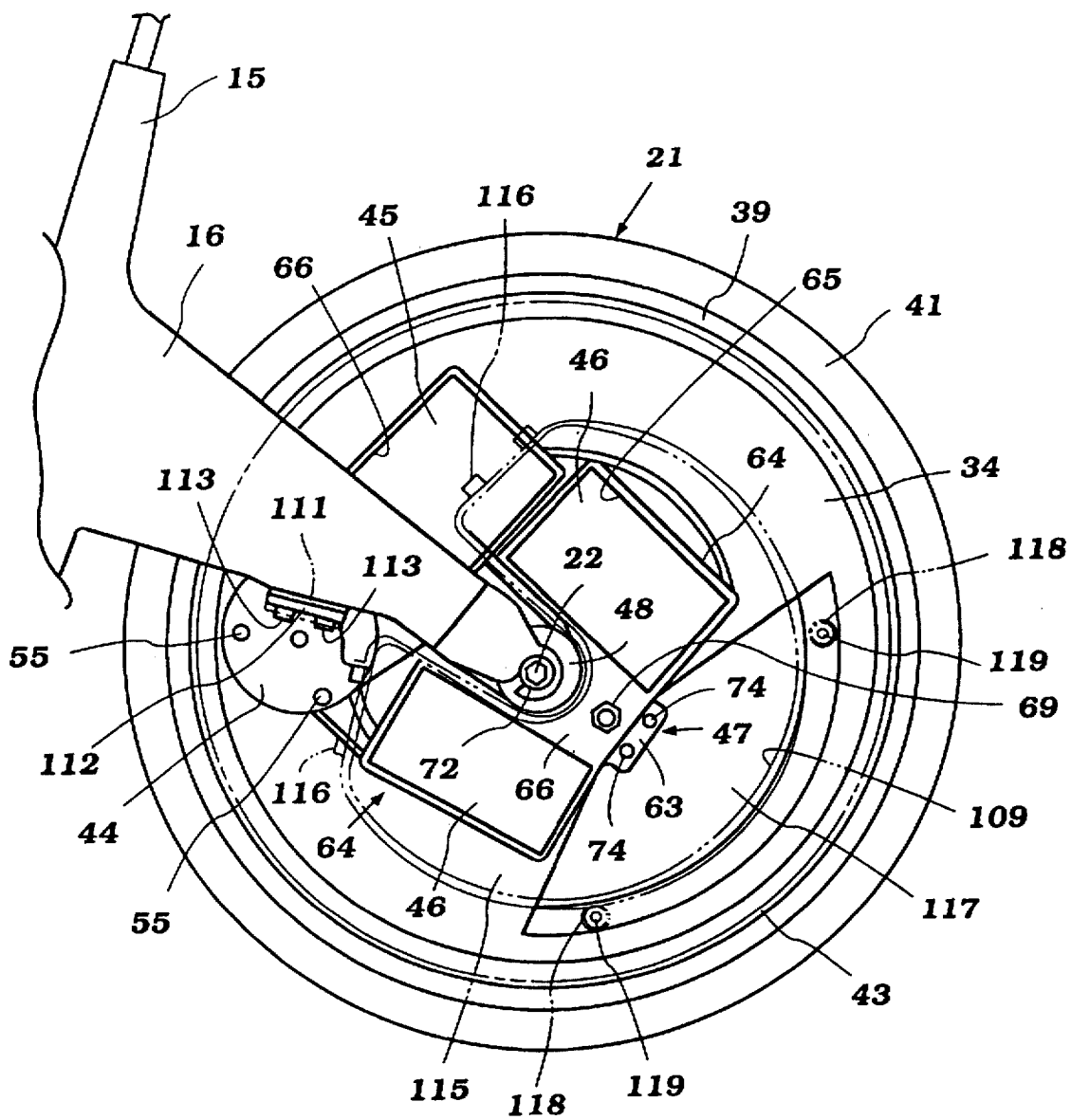
FIG. 2 is an enlarged view of the rear wheel and its mounting arrangement with the stationary rear wheel cover removed to more clearly show the construction.

An electric power arrangement for providing motor power to the rear wheel 21 is concealed and contained within this cavity 42. This mechanism is comprised of an electric motor, indicated generally by the reference numeral 44, a controller assembly, indicated generally by the reference numeral 45 and which is disposed on the same side of the axis defined by the axle 22 and the motor 44, but on opposite sides of the trailing arm 16 as best shown in FIG. 2. The control 45 may operate by any desired strategy for applying electrical power, derived from a source to be noted, to the motor 44 for energizing it and driving the rear wheel 21 through a transmission, which will also be described later.

In accordance with one type of control strategy, the power applied to the electric motor 44 may be dependent upon the actual amount of manual force exerted by the operator on the crank and pedal assembly 24. Thus, a suitable torque detecting mechanism may be associated with the pedal assembly 24 and outputs a signal to the controller 45. Since this particular control strategy forms no part of the invention in this application, a further description of it is not believed to be necessary to permit those skilled in the art to practice the invention.

This electrical power is derived from a battery source, in the illustrated embodiment, being comprised of a pair of batteries 46 which may be of any type including rechargeable batteries that are disposed on opposite sides of the axle 22 and in the illustrated embodiment 1 above the axle 22 and other below it. These batteries 46 are offset to one side of the electric motor 44 and its controller 45.

The electric motor 44, controller 45 and batteries 46 are all carried by a carrier assembly, indicated generally by the reference numeral 47 and which will now be described by primary reference to FIG. 2 through 7. This carrier assembly 47 is also formed from a light weight, high strength material such as a composite material like that from which the wheel disc 21 is formed. It is comprised of a hub portion 48 that defines a cylindrical opening 49 that is telescoped around the wheel hub 31, but which is fixed against rotation relative to it in a manner which will be described.

The part adjacent the fixed hub portion 48 is formed with a cavity 51 which is also filled with a light weight strengthening material 52 so as to add rigidity to the carrier 47.

The carrier 47 has an outwardly extending arm portion 53 that defines a pocket 54 in which the outer housing of the electric motor 44 is received. A plurality of threaded fasteners comprised of bolts 55, nuts 56 and washer 57 are provided so as to affix the motor. 44 to the carrier 47 in this recess 54. The electric motor output shaft 58 thus extends through an opening 59 formed in the carrier portion 53 and toward the wheel disc 34 for driving it through a transmission, which will be described in more detail later.

Adjacent the motor mounting portion 53, the carrier 47 is provided with a further outstanding portion 61 that defines a recess 62 into which the control 45 is positioned and affixed in any suitable manner. Hence, the controller 45 is juxtaposed in proximity to the motor 44 which it controls, but is disposed on the opposite side of the trailing arm 16 from the motor 44 so as to balance the weight.

Figure 8:
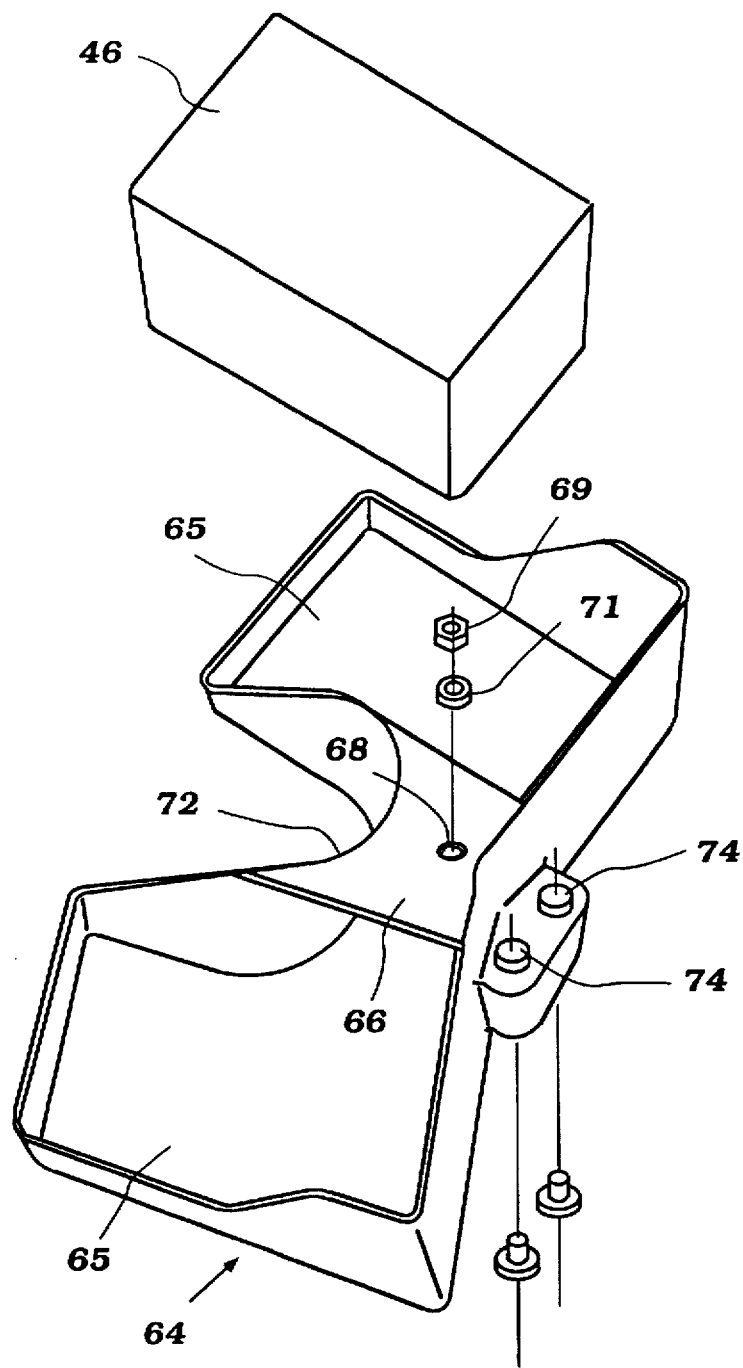
FIG. 8 is an enlarged, exploded perspective view showing the battery case and one of the batteries and how it is attached to the remainder of the supporting mechanism.

The carrier has a further mounting bracket portion 63 disposed on the side of the hub 48 opposite the electric motor mounting portion 53 and the controller mounting portion 61. A battery case, indicated generally by the reference number 64 and having a construction best shown in FIG. 8 is mounted on this portion 63. The battery case 64 has a pair of battery receiving recesses 65 disposed on opposite sides of a flattened portion 66 which overlies the mounting bracket portion 63. A fastening stud 67 is affixed to the mounting bracket portion 63 and extends through an opening 68 formed in the portion 66 to receive a nut 69 and washer 71 for affixing the battery case 64 to the mounting bracket 47.

It should be noted that the battery receiving recesses 65 are disposed at an angle to each other so that they diverge in a generally forward direction so as to facilitate nesting around the trailing arm 16 as best seen in FIG. 2. This assist in maintaining a compact construction.

The battery case 64 is provided with an arcuate recess 72 which is complementary to and received around the hub portion 48 of the mounting bracket 47. The batteries 46 are retained in the battery receiving pockets 65 by elastic straps 73.

The battery case 64 is provided with a pair of terminals 74 (FIG. 8) that are brought into engagement with terminals 75 (FIG. 7), that are received in the mounting bracket portion 63 with interposed springs 76. Nuts 77 are affixed thereto and provide an electrical connection to cables which supply electrical power to the controller 45 for controlling of the electric motor 44 in any suitable manner, as previously described.

The transmission mechanism by which the electric motor 44 drives the rear wheel 21 will now be described by primary reference to FIGS. 6, 7, 9 and 10, although certain components of this transmission mechanism appear in other figures. This transmission mechanism is indicated generally by the reference numeral 78 and includes the output shaft 58 of the motor 44 as afore-described. A driving pulley 79 is mounted on the motor output shaft 58 by means of a one-way clutch 81 and a bearing 82 that are held axially in position by means of a retaining nut 83 and washer 84. The one-way clutch 81 permits the wheel 21 to rotate without rotating the motor shaft 58 and transmits drive from the motor shaft 58 to the wheel 21 only when the motor shaft is operating at a higher rate of speed than that at which the wheel 21 is otherwise rotating.

Figure 3:
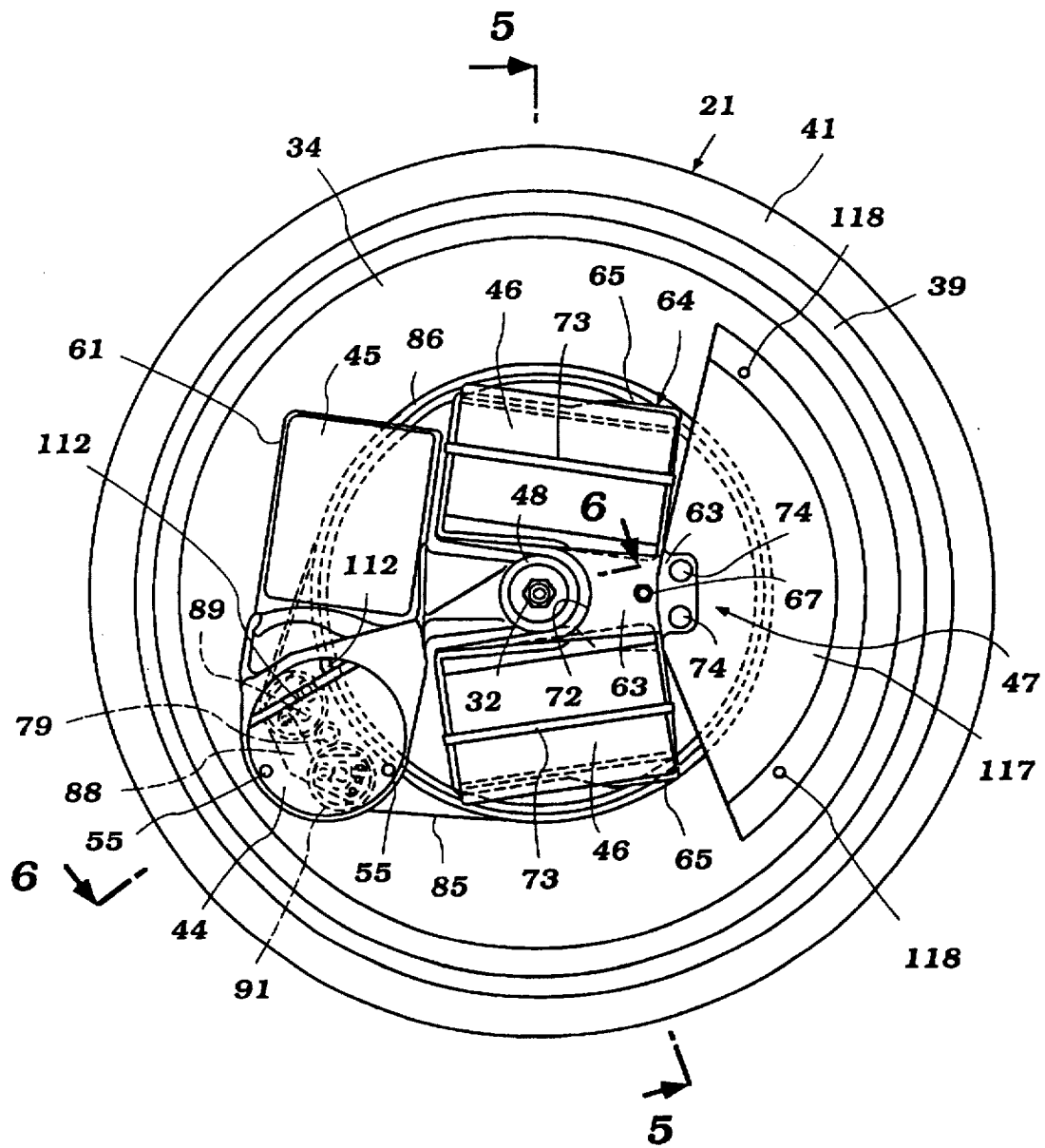
FIG. 3 is a side elevational view, in part similar to FIG. 2, but shows the wheel disassembled from the vehicle and still with the stationary cover removed.
Figure 4:
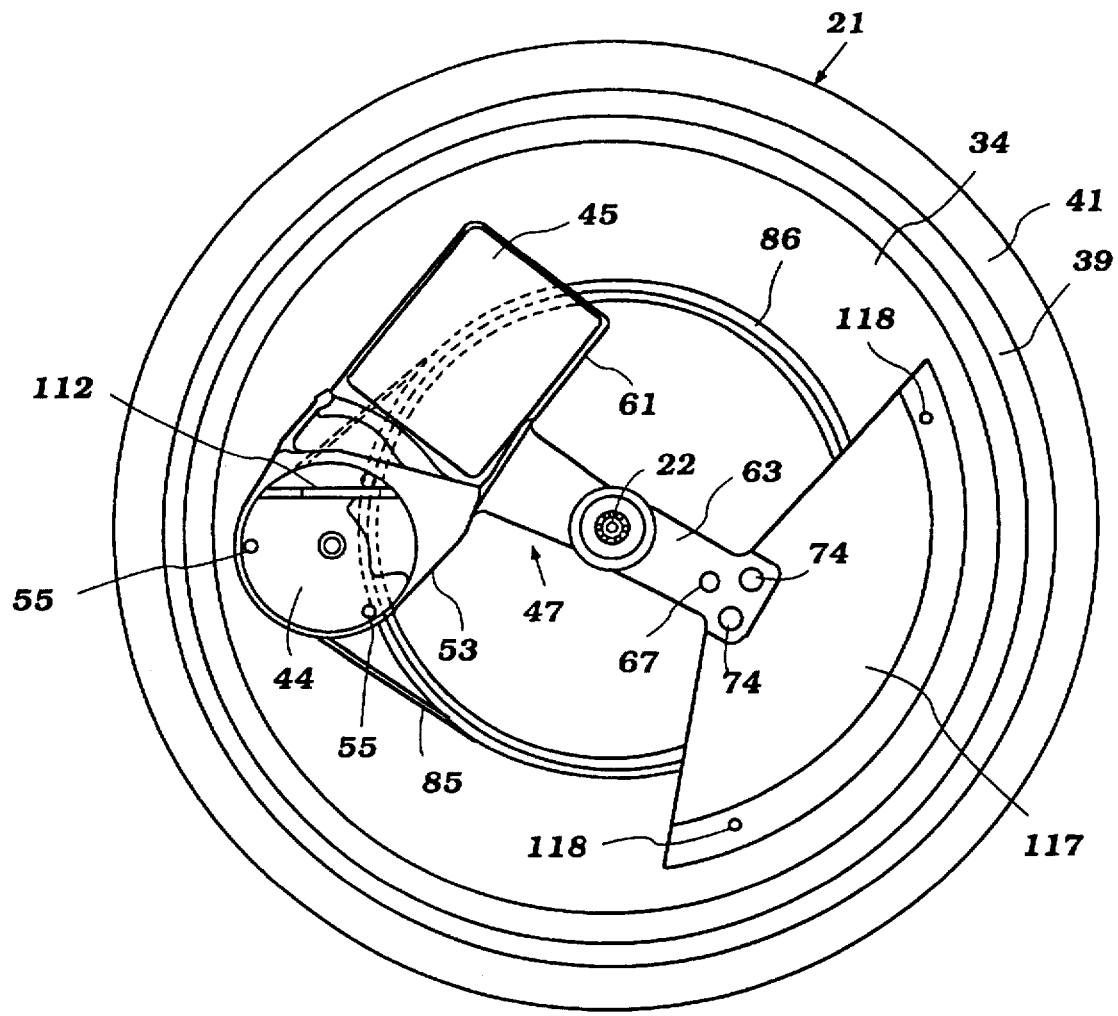
FIG. 4 is a side elevational view, in part similar to FIG. 3, and shows the battery and battery cases removed from the assembly so as to more clearly show certain complements of the construction.

The drive pulley 79 drives a drive belt 85 which, in turn, drives a driven pulley 86 that is formed integrally with the disc shaped member 34 of the wheel 21 on the side within the afore-noted cavity 42. It should be noted that the integral driven pulley 86 formed by the disc shaped member 34 of the wheel 21 has a diameter that is sufficient so that it surrounds the battery case 64 and the batteries contained therein as best seen in FIGS. 3 and 5. Hence, this provides a very compact construction. In addition and as shown in FIG. 5, the batteries 46 and the battery containing recesses 65 are disposed so that the batteries are inclined to the axis defined by the axle 22 so as to also provide a more compact construction. In order to provide the desired tension for the drive belt 85, there is provided an automatic tensioner mechanism, indicated generally by the reference numeral 87. This tensioner mechanism 87 maintains a tension on the drive belt 85 that is related to the amount of power transmitted. This minimizes the total loading on the drive belt 85 while, at the same time, ensuring against slippage.

Figure 9:
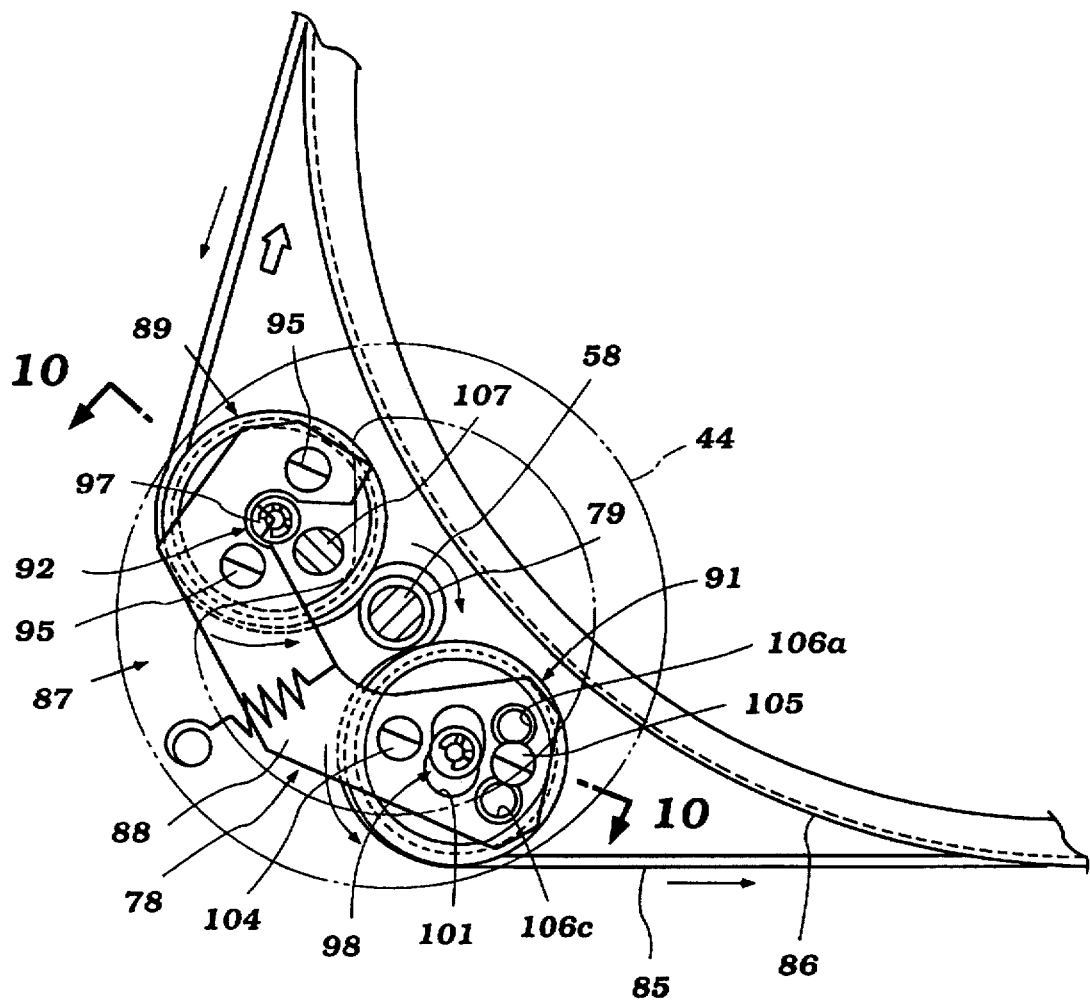
FIG. 9 is a view showing the relationship of the electric motor and automatic belt tensioner mechanism.
Figure 10:
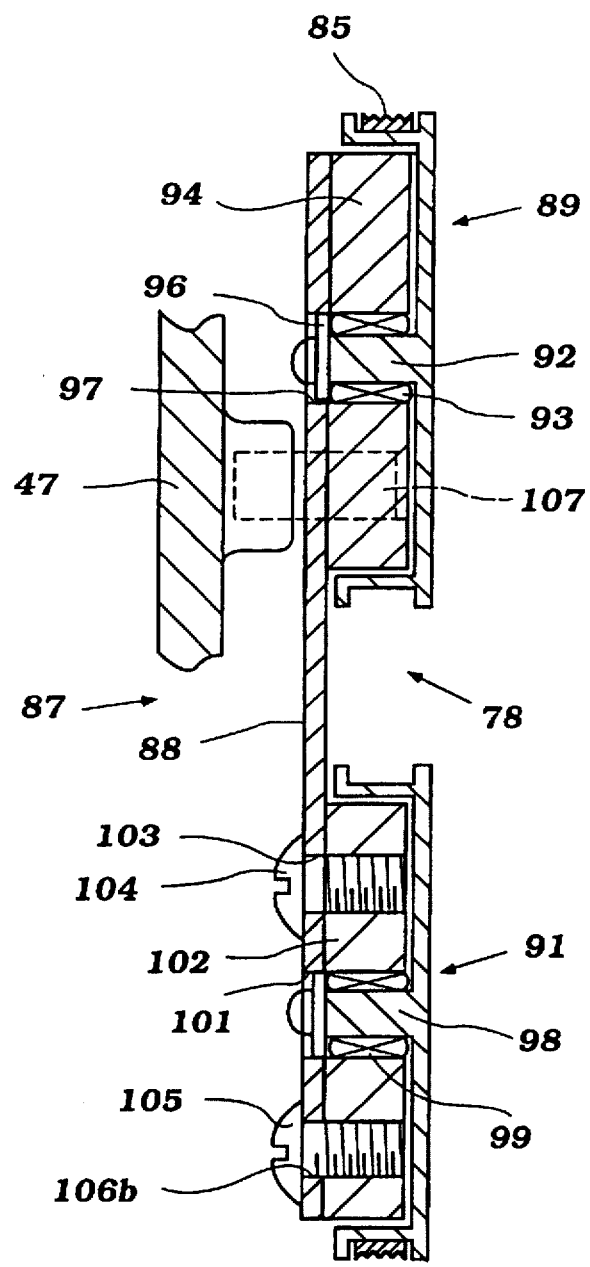
FIG. 10 is an enlarged cross-sectional view taken along the line 10—10 of FIG. 9.

The tensioner mechanism 87 is comprised of an idler pulley bracket 88 on which a pair of idler pulleys 89 and 91 are journaled in a manner which will be described. The idler pulleys 89 and 91 are mounted, as best shown in FIG. 9, so that they will be disposed substantially on diametrically opposite sides of the drive pulley 79 which rotates when the motor shaft 58 is operated in the direction of the arrow in this figure. The idler pulley 89 has a pulley shaft 92 that is rotatably journaled in a bearing member 93 carried by a first bearing block 94. The bearing block 94 is mounted in a fixed location on the idler bracket 88 by means of threaded fasteners 95. The idler pulley 89 is held axially in position by means of a snap ring 96 that is received on a portion 97 that extends through the idler bracket 88.

The idler pulley 91 is mounted in a similar manner, however, its mounting permits adjustment so as to set the initial tension on the driving belt 35. To this end, the idler pulley 91 is provided with a shaft 98 which is journaled within a bearing 99 that is movable in an arcuate slot 101 formed in the idler pulley bracket 88. A bearing block 102 has a first tapped opening that is aligned with a fixed opening 103 in the idler bracket 88 and through which a screw 104 passes. The screw 104, provides a fulcrum for the selective positioning of a further screw 105 in selected one of three apertures 106a, 106b and 106c formed in the idler bracket 88 so that the angular position of the bearing block 102 and initial spacing of the axis 98 of the idler pulley 91 from the axis 92 of the idler pulley 89 may be adjusted so as to provide initial pre-loading of the tension on the drive belt 85.

In addition, the mechanism provides for automatic adjustment of the tensioning, depending upon the driving load. To this end, the idler bracket 88 has an opening that provides a pivotal support on a supporting pin 107 that is affixed to the mounting bracket 47. This pivot axis defined by the pin 107 is disposed between the rotational axis of the idler pulley portion 92 and the rotational axis of the motor drive shaft 58 on the driving side of the drive belt. As a result, when the driving load increases, a reactive force, indicated by the open arrow in FIG. 9, will be exerted on the idler pulley bracket 88 so as to effect rotation in a direction about the pin 107 that causes the idler pulley 91 to swing in a clockwise direction to increase the tension.

This pivotal movement is resisted by a tension spring 108 that is interposed between the mounting bracket 47 and the idler pulley bracket 88. As a result, the tension on the drive belt 85 will be adequate to preclude slipping regardless of the degree of load. This is also accomplished with only applying the tension necessary to avoid slippage. Thus wear on the drive belt is reduced and its effective life lengthened. Also servicing of the belt to adjust its tension is avoided or substantially reduced.

It has been previously noted that the wheel cavity 42 is enclosed by the disc shaped member portion 34 of the wheel 21 itself and a non-rotating cover disc 43. The manner in which the cover disc 43 is affixed against rotation to the bicycle frame 12 and the way in which the mounting bracket assembly comprised in the mounting bracket 47 and battery case 64 is also non-rotatably affixed will now be described by primary reference to FIGS. 1 through 4.

It should be noted that the stationary disc 43 is provided with a cutout portion 109 which offers an access window through which the batteries 46 may be inspected and replaced. This disc 43 has a slit along which a flange portion 111 that extends outwardly and which flange is captured between a bracket 112 and the lower portion of one bifurcated side of the trailing arm 106. The bracket 112 is suitably fixed to the electric motor 44. Threaded fasteners 113 affix the components together so as to not only affix the disc 43 non-rotatably to the frame 12, but also so as to assist in non-rotatably affixing the mounting bracket 47 and the battery carrier 64. Also, the nut 33 that retains the axle 22 in position will also affix this assemblage in place.

The fixed disc 43 carries a switch assembly 114 which may comprise the main switch of the electrical system for powering the electric motor 44. In other words, the switch 114 switches the controller 45 on or off on operator demand. If desired, this switch can be a key operated switch.

As has been previously noted, the stationary cover disc 43 is provided with an opening or window 109 which has an extent so as to permit the batteries 46 to be accessed for servicing, recharging and replacement. This window is normally closed by means of a closure plate 115 that has a pair of tab portions 116 that extend beyond and beneath the peripheral edges of the fixed disc 43 around the opening 109 so as to provide a pivotal attachment thereto. In addition, a pie-shaped supporting member 117 is affixed to the supporting bracket 47 and specifically the arm 63 thereof, as by the terminals 75 and the retaining nuts that hold them in place. This plate 117 is formed with tapped openings 118 that receive locking screws 119 for holding the cover plate 115 in position. Finally, a key operated lock 121 may also be provided for assisting in locking the stationary cover disc 43 and cover plate 115 in position.

Thus, from the foregoing description, it should be readily apparent that the described arrangement provides a very effective and compact electric motor drive for a vehicle wheel which can be readily serviced, does not add to the weight of the frame and, thus, permits ease of manual manipulation. In addition, the construction can be easily serviced and the transmission for driving the wheel provides not only a substantial speed reduction, but also maintains the desired tension on the drive belt without having the belt highly load under low load conditions. Of course, the foregoing description is that of a preferred embodiment of the invention and various changes and modifications may be made without departing from the spirit and scope of the invention, as defined by the appended claims.

We claim:

1. A power wheel for providing a propulsive force for an associated vehicle, said wheel having a hub adapted to be rotatably journalled upon an axle defining an axis, a rim extending circumferentially around said hub and adapted to mount a tire, said hub and said rim being connected to each other by means of a disk-shaped member formed on one side of the wheel and defining a cavity, a supporting assembly within said cavity including a supporting bracket fixed axially relative to said hub in surrounding relation thereto and fixed against rotation by a direct connection to said vehicle, said supporting bracket forming a battery case on one side of said hub, an electric motor directly carried by said supporting bracket and disposed circumferentially between said hub and said rim and extending axially a distance not substantially greater than the axial length of at least one of said hub and said rim, and a transmission disposed between said electric motor and said wheel for driving said wheel from said electric motor, said battery case being disposed circumferentially between said hub and said rim and adapted to carry a battery, the battery and said battery case together having an axial length not substantially greater than the axial length of at least one of said hub and said rim, and a fixed disk-shaped cover separate from said supporting assembly and independently affixed against rotation on the other side of said wheel and closing said cavity.

2. A power wheel as set forth in claim 1, wherein the battery case and the electric motor are disposed on opposite sides of a plane containing the axis defined by the axle.

3. A power wheel as set forth in claim 2, wherein the battery case and electric motor are disposed substantially diametrically opposed to each other.

4. A power wheel as set forth in claim 1, wherein the transmission includes a driven element drivingly engaged with a part of the wheel.

5. A power wheel as set forth in claim 4, wherein the wheel driven element comprises a pulley.

6. A power wheel as set forth in claim 5, wherein the battery case is disposed radially inwardly of the pulley.

7. A power wheel as set forth in claim 6, wherein the battery case is disposed so that the battery lies at an angle to the axis of rotation of the wheel.

8. A power wheel as set forth in claim 6, wherein the battery case is configured so as to accommodate a pair of batteries disposed on opposite sides of a plane containing the axis defined by the axle.

9. A power wheel as set forth in claim 8, wherein the batteries contained within the battery case diverge from the plane in a forward direction.

10. A power wheel as set forth in claim 5, wherein the transmission comprises a flexible transmitter transmission and the electric motor has an output shaft drivingly engaged with a flexible transmitter of said flexible transmitter transmission.

11. A power wheel as set forth in claim 10, wherein the flexible transmitter transmission comprises a driving pulley affixed to the output shaft of the electric motor, an idler pulley bracket carrying a pair of idler pulleys rotatable about axes parallel to the axis of said driving pulley and disposed on opposite sides thereof, said flexible transmitter being entrained around said driving pulley and said idler pulleys for transmitting drive from said driving pulley to said wheel through a driving flight thereof, and means for supporting said idler pulley bracket about a pivotal axis parallel to the pivot axis of said pulleys and on the side of said driving pulley where the driving flight of said flexible transmitter is positioned for pivoting said idler bracket to maintain tension on said flexible transmitter relative to a driving load.

12. A power wheel as set forth in claim 11, wherein the pivot axis of the idler pulley bracket is disposed between one of the idler pulleys and the driving pulley.

13. A power wheel as set forth in claim 12, further including biasing spring means for biasing the idler pulley bracket about its pivot axis to the support bracket to maintain an initial preload on the flexible transmitter.

14. A power wheel as set forth in claim 1, wherein the cover is formed with an opening, said cover opening being juxtaposed to said battery case for permitting removal of batteries therefrom without removing said cover and a detachable cover plate affixed to said cover in closing relation to said cover opening.

15. A power wheel as set forth in claim 14, wherein the disk-shaped member is formed with an integral transmission element driven by the transmission for driving the wheel.

16. A power wheel as set forth in claim 15, wherein the fixed cover has a hub portion that is disposed around the hub of the wheel at one side thereof.

17. A power wheel as set forth in claim 16, wherein the battery case and the electric motor are disposed on opposite sides of a plane containing the axis defined by the axle.

18. A power wheel as set forth in claim 17, wherein the battery case and electric motor are disposed substantially diametrically opposed to each other.

19. A power wheel as set forth in claim 18, wherein the integral transmission element comprises a pulley.

20. A power wheel as set forth in claim 19, wherein the transmission comprises a single flexible transmitter transmission and the electric motor has an output shaft drivingly engaged with a driving flight of the single flexible transmitter of said single flexible transmitter transmission.

21. A power wheel as set forth in claim 20, wherein the battery case is disposed radially inwardly of the pulley.

22. A power wheel as set forth in claim 21, wherein the battery case is disposed so that the battery lies at an angle to the axis of rotation of the wheel.

23. A power wheel as set forth in claim 21, wherein the battery case is configured so as to accommodate a pair of batteries disposed on opposite sides of a plane containing the axis defined by the axle.

24. A power wheel as set forth in claim 23, wherein the batteries contained within the battery case diverge from the plane in a forward direction.

25. A power wheel as set forth in claim 20, wherein the flexible transmitter transmission comprises a driving pulley affixed to the output shaft of the electric motor, an idler pulley bracket carrying a pair of idler pulleys rotatable about axes parallel to the axis of said driving pulley and disposed on opposite sides thereof, said flexible transmitter being entrained around said driving and said idler pulleys for transmitting drive from said driving pulley to said wheel, and means for supporting said idler pulley bracket upon the supporting brake t for pivotal movement about a pivotal axis parallel to the pivot axis of said pulleys and on the side of said driving pulley where the driving flight of said flexible transmitter is positioned for pivoting said idler bracket to maintain tension on said flexible transmitter relative to the driving load.

26. A power wheel as set forth in claim 25, wherein the pivot axis of the idler pulley bracket is disposed between one of the idler pulleys and the driving pulley.

27. A power wheel as set forth in claim 1, further including a controller positioned circumferentially between the hub and the rim for controlling the application of electrical power from a battery carried by the battery case to the electric motor.

28. A power wheel as set forth in claim 27, wherein the controller, the battery case, and the electric motor are all contained and supported by a common supporting bracket fixed axially relative to the hub and held against circumferential rotation by attachment to an associated vehicle.

29. A power wheel as set forth in claim 28, wherein there are provided a pair of battery cases disposed on opposite sides of a plane containing the axis defined by the axle and each adapted to receive a respective battery.

30. A power wheel as set forth in claim 29, wherein the battery cases are disposed diametrically opposite to each other.

31. A power wheel as set forth in claim 28, wherein the hub and the rim are connected to each other by means of a disk shaped member formed on one side of the wheel and defining a cavity containing the electric motor, the transmission, and the battery case, said cavity being closed by a fixed disk shaped cover affixed on the other side of the wheel and holding the battery case and electric motor against rotation relative to the axle.

32. A power wheel as set forth in claim 31, wherein the cover is formed with an opening, said cover opening being juxtaposed to said battery case for permitting removal of batteries therefrom without removing said cover and a detachable cover plate affixed to said cover in closing relation to said cover opening.

33. A power wheel as set forth in claim 32, wherein the wheel disk shaped member is formed with an integral transmission element driven by the transmission for driving the wheel.

34. A power wheel as set forth in claim 33, further including a controller positioned circumferentially between the hub and the rim for controlling the application of electrical power from a battery carried by the battery case to the electric motor.

* * * * *